United States Patent [19]
Murase et al.

[11] 3,944,740
[45] Mar. 16, 1976

[54] COORDINATE POSITION INFORMATION OUTPUT DEVICE

[75] Inventors: Kenji Murase, Kakogawa; Shizuo Andoh, Kobe, both of Japan

[73] Assignee: Fujitsu Limited, Kawasaki, Japan

[22] Filed: July 22, 1974

[21] Appl. No.: 490,337

[30] Foreign Application Priority Data
July 31, 1973 Japan.................................. 48-86174
July 31, 1973 Japan.................................. 48-86175

[52] U.S. Cl. ............................... 178/18; 340/324 M
[51] Int. Cl.² .......................................... G08C 21/00
[58] Field of Search ................. 307/320; 178/18, 19; 340/324 R, 324 M

[56] References Cited
UNITED STATES PATENTS

| | | | |
|---|---|---|---|
| 3,573,542 | 4/1971 | Mayer et al..................... | 340/324 M |
| 3,757,322 | 9/1973 | Barkan et al. ......................... | 178/18 |
| 3,774,196 | 11/1973 | Fleming............................ | 340/324 M |
| 3,783,445 | 1/1974 | Penwarden ............................ | 178/18 |
| 3,833,832 | 9/1974 | Fein et al. ....................... | 340/324 M |

*Primary Examiner*—Thomas A. Robinson
*Attorney, Agent, or Firm*—Staas & Halsey

[57] ABSTRACT

A coordinate position information output device is disclosed in which the impedance at a position addressed by a contact pen, a light pen, a magnetic pen or the like is varied; a forward current is caused to flow by the impedance change in a charge storage diode; and a backward current flowing in the charge storage diode for a moment immediately thereafter is utilized as coordinate position information.

13 Claims, 11 Drawing Figures

FIG. 5
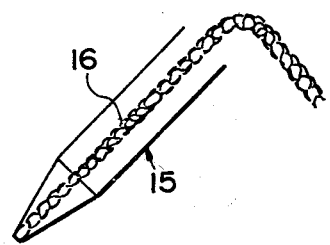
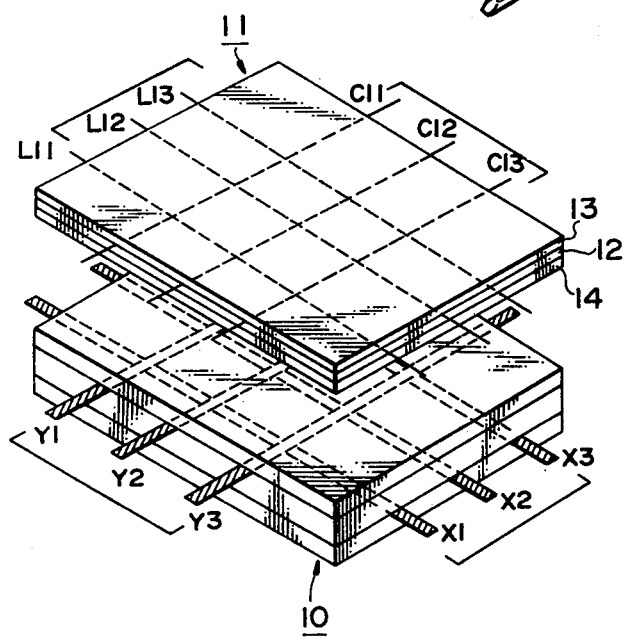
FIG. 6
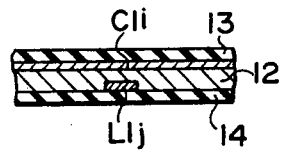

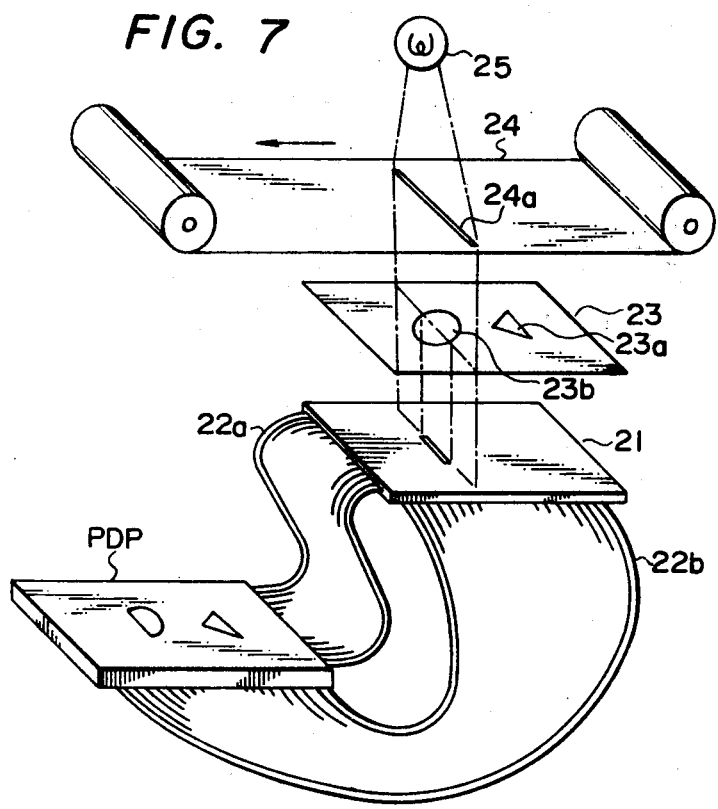
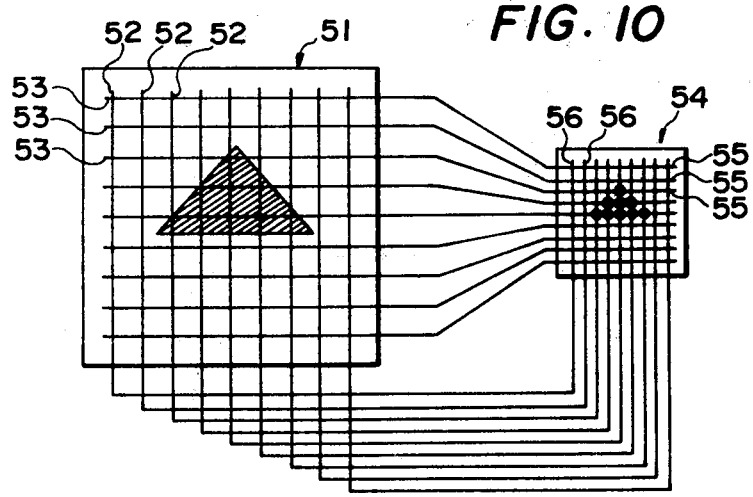

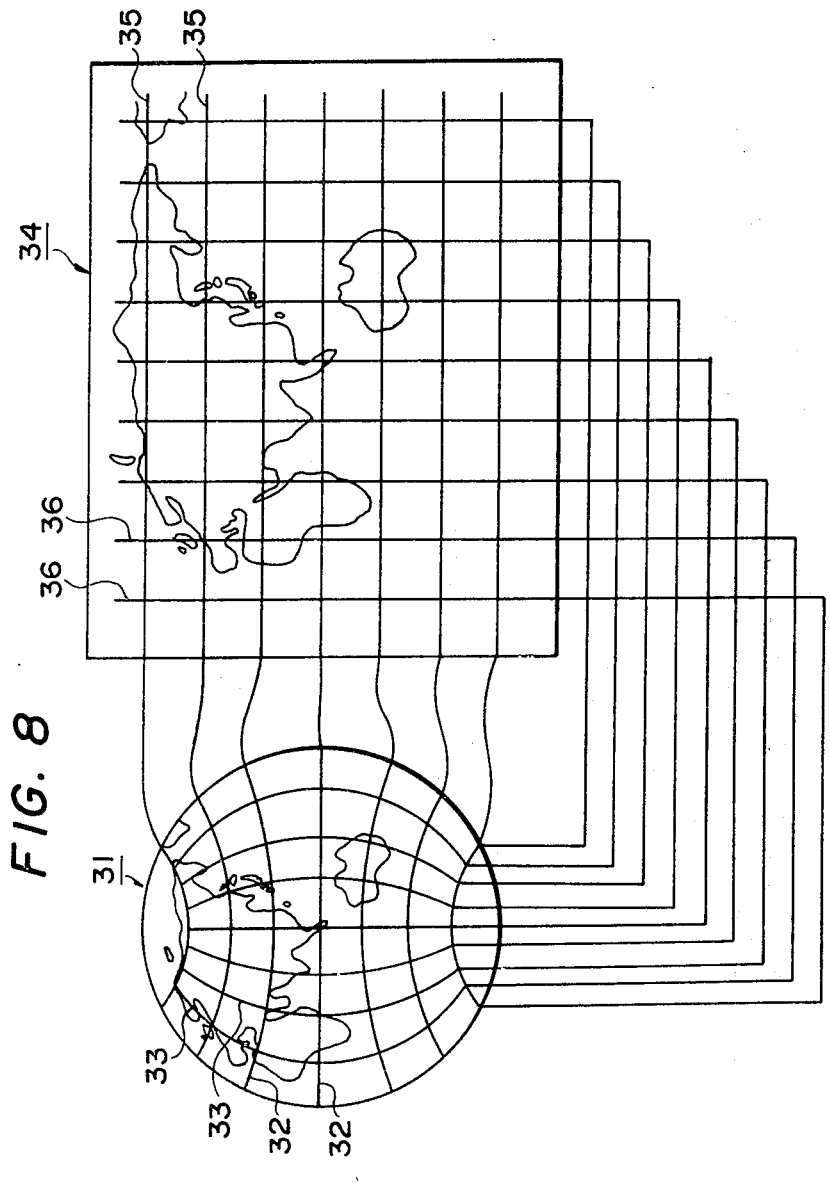

COORDINATE POSITION INFORMATION OUTPUT DEVICE

BACKGROUND OF THE INVENTION

1. Field of the Invention

This invention relates to a coordinate position information output device, and more particularly to a coordinate position information output device in which information at the coordinate position addressed with a contact pen, light pen, heat pen, magnetic pen or the like is applied to a display device to effect writing, erasing, etc.

2. Description of the Prior Art

In the field of graphic display, since a high value is set on man-machine communication, it is necessary that coordinate information to be addressed is properly generated by an operator's addressing. A known device for generating such coordinate information is an address tablet having a matrix-like electrode arrangement and called RAND TABLET, and it is employed in a display system of the type using a cathode ray tube.

However, such a conventional coordinate position information output device involves complicated peripheral circuits. Further, in this known device, information at a coordinate position is provided in a coded form suitable for application to a computer, so that, in order to address a matrix-like display device, it is necessary to decode the output information through a computer and then to designate a coordinate position to be addressed and drive a drive circuit. There has also been proposed such a method that, in a display panel having a matrix-like electrode such as a plasma display panel, a coordinate position is addressed directly with a voltage pen or light pen for writing and erasing. With this direct pen address system, however, an accurate operation cannot be expected and many problems still remain unsettled for putting this system to practical use and, in addition, it is impossible to apply an input from a desired position apart from the display panel.

SUMMARY OF THE INVENTION

An object of this invention is to provide a novel coordinate position information output device in which, by addressing an intersecting point of a matrix-like electrode arrangement with a pen such as a contact pen, a light pen, a heat pen, a magnetic pen or the like, information at the addressed position is picked up and in which peripheral circuits therefor are simplified to thereby permit the output information to be used directly as an impression voltage for writing, erasing or the like on a display device.

Briefly stated, the coordinate position information output device of this invention is characterized by the provision of a coordinate position indicating plate having formed thereon column and line electrodes spaced apart from each other at least at each of their intersecting points through an element whose resistance varies with pressure, light, heat, magnetic field or the like applied thereto, or insulated from each other; charge storage diodes so connected as to flow therein a current in a forward direction due to lowering of the resistance of the element at the intersecting point by pressure, light, heat, magnetic field or the like, or due to short-circuiting of the intersecting point; and voltage impressing means by which a current flowing in the conducted charge storage diode in a backward direction for a moment is used as coordinate position information.

Other objects, features and advantages of this invention will become more apparent from the following description taken in conjunction with the accompanying drawings.

BRIEF DESCRIPTION OF THE DRAWINGS

FIG. 5 is a diagram, for explaining another example of this invention;

FIG. 6 is a cross-sectional view showing the principal part of the coordinate position indicating plate; and FIGS. 7 to 11, inclusive, are diagrams, for explaining other examples of this invention, respectively.

DESCRIPTION OF THE PREFERRED EMBODIMENTS

Figure 1:
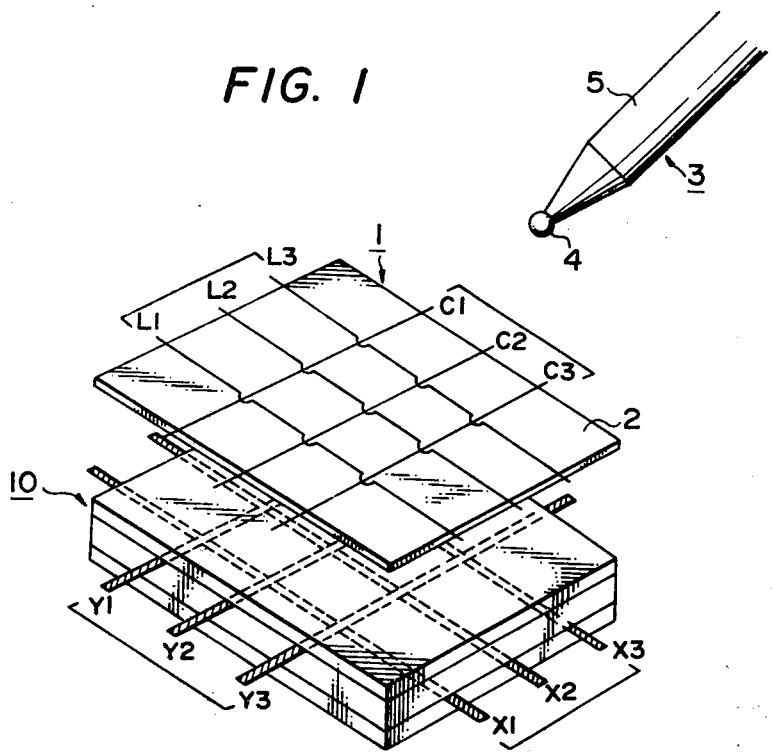
FIG. 1 is a diagram, for explaining one example of this invention.

FIG. 1 shows in perspective the principal part of one example of this invention. A coordinate position indicating plate 1 comprises an insulating plate 2, which is transparent when mounted on a matrix display device 10 and transparent or opaque when disposed separately of the device 10, line electrodes L1, L2, ... and column electrodes C1, C2, ... disposed to intersect the line electrodes at right angles, the line and column electrodes being disposed on the insulating plate 2 and insulated from each other at their intersecting points. A pen 3 comprises a conductor 4 at its tip and an insulating rod 5. With the above arrangement, each intersecting point of the electrodes of the coordinate position indicating plate 1 can be short-circuited by the conductor 4 of the pen 3.

The matrix display device 10 may be, for example, a plasma display panel, in which electrodes X1, X2, ... and electrodes Y1, Y2, ... covered with dielectric layers are disposed to intersect each other at right angles in contact with a discharge gas sealed space and discharge cells are formed at the intersecting points of the electrodes, as is well-known in the art.

Figure 2:
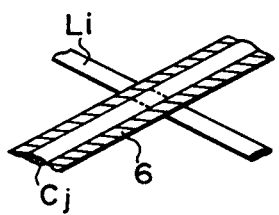
FIG. 2 is a diagram, for explaining an intersecting point of electrodes of a coordinate position indicating plate.

FIG. 2 illustrates one example of the electrode intersecting point of the coordinate position indicating plate 1. The line electrode Li ($i=1, 2, ...$) and the column electrode Cj ($j=1, 2, ...$) are insulated from each other by an insulating layer 6 formed on the underside of the column electrode Cj. The curvature of the conductor 4 of the pen 3 is selected to enable short-circuiting of the electrode intersecting point. It is considered more effective to employ the conductor 4 made of a conductive rubber.

Figure 3:
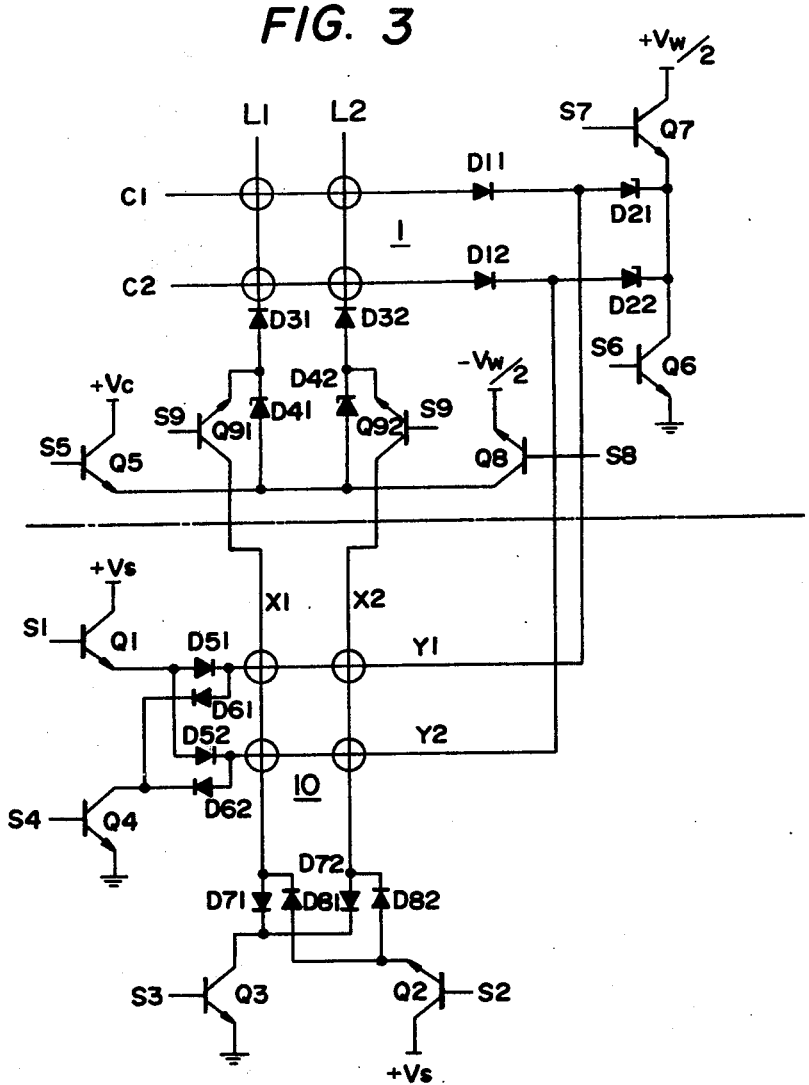
FIG. 3 is a circuit diagram showing connections of the principal part between the coordinate position indicating plate and a matrix display device.

The coordinate position indicating plate 1 and the matrix display device 10 are interconnected through a circuit shown in FIG. 3. In FIG. 3, reference characters Q1 to Q8, Q91 and Q92 indicate transistors and D11 to D82 designate diodes, the diodes D21, D22, D41 and D42 being charge storage diodes. As is well-known in the art, the charge storage diode is capable of flowing therein a current in a backward direction for a moment after flowing a forward current.

Figure 4:
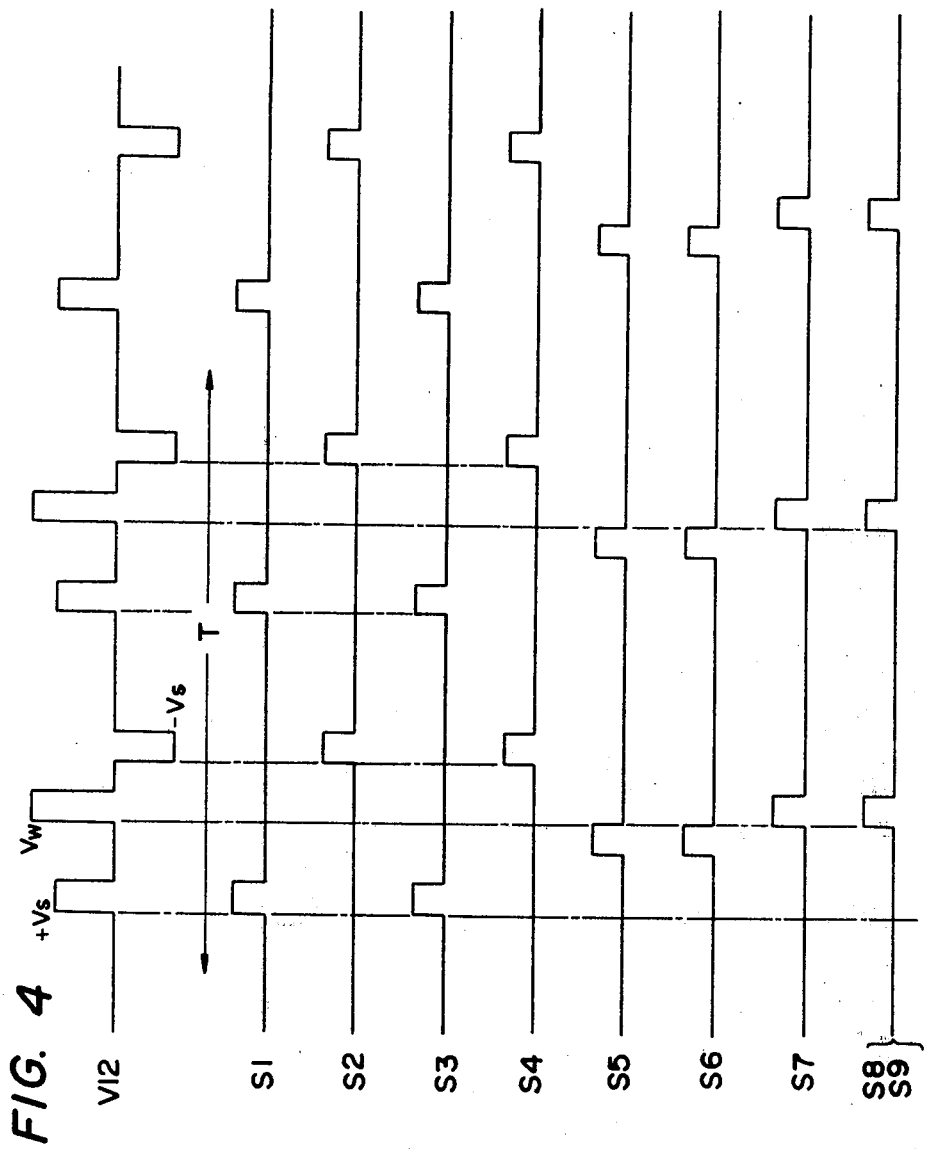
FIG. 4 is a waveform diagram, for explaining the operation of the circuit shown in FIG. 3.

Signals S1 to S9 which are applied to the bases of the transistors are selected to be of such timing as depicted in FIG. 4. The electrodes Y1, Y2 of the plasma display panel, which is one example of the matrix display device 10, are supplied with a voltage +Vs by the transistor Q1 at the timing of the signal S1 and grounded through the transistor Q4 at the timing of the signal S4. The electrodes X1, X2 are supplied with the voltage +Vs by the transistor Q2 at the timing of the signal S2 and grounded through the transistor Q3 at the timing of the signal S3. Consequently, the discharge cells at the intersecting points of the electrodes X1, X2 and Y1, Y2 are supplied with a sustain voltage composed of the pulses +Vs and −Vs as indicated by V12 in FIG. 4.

The electrodes L1 and L2 of the coordinate position indicating plate 1 are supplied with a pulse voltage +Vc, for example, +5V, through the transistor Q5 at the timing of the signal S5. For example, when the intersecting point of the electrodes L1 and C2 is short-circuited by the pen 3, the impedance at that intersecting point is reduced from infinity to zero and the transistors Q5 and Q6 are simultaneously turned on by the signals S5 and S6. As a result, the voltage +Vc is applied to a line from the transistor Q5 to the transistor Q6 through the diode D41, the diode D31, the line electrode L1, the column electrode C2, the diode D12 and the diode D22 to flow a current in the line. At the next instant, the transistors Q7, Q8, Q91 and Q92 are turned on by the signals S7, S8 and S9, so that the charge storage diodes, i.e. the diodes D22 and D41 in which the current was previously caused to flow forward, will now conduct in a backward direction for a moment. Therefore the electrode Y2 of the plasma display panel is supplied with a voltage +Vw/2 through the transistor Q7 and the diode D22, and the electrode X1 is supplied with a voltage −Vw/2 through the transistor Q8, the diode D41 and the transistor Q91. As a result of this, the discharge cell at the intersecting point of the electrodes X1 and Y2 is supplied with a write voltage Vw. Vw is higher than a firing voltage and occurs after the voltage +Vs, as indicated by V12 in FIG. 4.

Reference character T in FIG. 4 represents the time for short-circuiting by the pen 3, showing the case in which the write voltage Vw is applied twice in the short-circuiting period. If short-circuiting continues for a longer period of time, the write voltage Vw is repeatedly applied. However, once a discharge spot has been produced in the discharge cell of the plasma display panel, the discharge spot is continuously maintained by the sustain voltage even after the pen 3 is disconnected, thereby providing a display.

If the level or the pulse width of the voltage applied through the transistors Q7 and Q8 is selected so that the voltage may become an erasing voltage, it is possible to erase the discharge cell of the plasma display panel corresponding to the position short-circuited by the pen 3 on the coordinate position indicating plate 1.

As described above, the electrodes L1, L2, C1 and C2 of the coordinate position indicating plate 1 are supplied with the low voltage pulse through the transistor Q5. However, larger voltages such as the write voltage Vw and so on are cut off from the electrode intersecting points by the leakage preventing diodes D11, D12, D31 and D32, so that this system is not dangerous to the operator. Further, information at the coordinate position addressed by the pen 3 can be picked up in the form of a voltage such as a write voltage, an erasing voltage or the like through the charge storage diode in which a current is caused to flow. Consequently, this invention is of particular utility when used with a plasma display panel capable of a memory display.

In the above example, the electrode intersecting point of the coordinate position indicating plate is short-circuited by the conductor pen. It is also possible to adopt a construction of a pressure-sensitive resistance element interposed at least at each of the intersecting points of the column and line electrodes and the impedance at the intersecting point can be lowered by a pressure with a pen, thereby causing a current to flow in the charge storage diode, with the same results as obtained above. Further, in the above example, the intersecting points of the electrodes of the coordinate position indicating plate 1 and those of the electrodes of the matrix display device 10 need not always completely correspond to each other but desired random correspondence is also possible. Moreover, the matrix display device 10 may be such a device as formed with luminescent diodes, liquid crystal, electroluminescence or the like. In the case of a device having no memory function in its self such as a plasma display panel, it is sufficient only to provide a device for storing coordinate position information. It is also possible, that the coordinate position information by the backward current of the charge storage diode is encoded on both sides of the column electrodes C1 and C2 and the line electrodes L1 and L2 and used as an information processing input.

As described above, in the foregoing example, the pen is brought into contact with the coordinate position indicating plate at a selected one of the electrode intersecting points. A forward current is caused to flow in the charge storage diode corresponding to the addressed intersecting point. Then a backward current flows in the charge storage diode after the forward flowing current is utilized as coordinate position information. Neither a high voltage nor a complicated pulse voltage is applied to the coordinate position indicating plate which is addressed with the pen, so that the device of the above example is easy to handle.

FIG. 5 is a perspective view showing the principal part of another example of this invention. A coordinate position indicating plate 11 is composed of column electrodes C11, C12, ... and line electrodes L11, L12, ... disposed to intersect each other at right angles; an element 12 whose resistance varies with light, heat, magnetic field, etc. and which is disposed in the form of an intermediate layer between the column and line electrodes at least at each intersecting point thereof; and insulating layers 13 and 14 disposed on the top and bottom surfaces of the above assembly. A pen 15 is a light pen, a heat pen or a magnetic pen. For example, in the case of the light pen, it is constructed to incorporate therein a light source or an optical fiber 16, as shown, to emit light from the tip of the pen. In the case of using such a light pen, the insulating layer 13 is formed of a transparent insulating material and the element 12 is formed of a photoconductor.

The photoconductive element 12 is formed of ZnO or ZnS in the region of ultraviolet rays (300 to 400 m$\mu$); ZnSe, CdS or CdSe in the region of visible rays (400 to 750m$\mu$); and PbS, PbSe, PbTe, InSe or Ge in the region of infrared rays (750 to 6000m$\mu$).

Where the coordinate position indicating plate 11 is mounted on a matrix display device 10 of the same construction as that employed in the foregoing example, the insulating layers 13 and 14 are are required to be transparent. Where the coordinate position indicating, plate 11 is placed separately of the matrix display device 10, the insulating layer 14 need not be transparent. Further, in the case of employing the heat or magnetic pen, if the positions of the electrode intersecting points are indicated, the insulating layers 13 and 14 may be opaque. The upper insulating layer 13 is provided for protecting the electrodes and may be dispensed with in some cases.

FIG. 6 shows in section the principal part of the intersecting point of the column electrode C1i ($i=1, 2, ...$) and the line electrode L1j ($j=1, 2, ...$). The intermediate element 12 is shown to be provided throughtout the coordinate position indicating plate but it may also be provided only at the intersecting points as referred to above. Further, it is also possible to obtain a similar coordinate position indicating plate by employing other light responsive elements, for example, photo diodes, as the column and line electrodes, that is, connecting them in a matrix form.

The matrix display device 10 may be a plasma display panel, in which electrodes X1, X2, ... and electrodes Y1, Y2, ... covered with dielectric layers are disposed to intersect each other at right angles in contact with a discharge gas space and discharge cells are formed at the intersecting points of the electrodes, as described previously.

The corrdinate position indicating plate 11 and the matrix display device 10 are interconnected with each other by the circuit shown in FIG. 3, as is the case with the foregoing example, and writing or erasing is effected on the matrix display device 10 at the position corresponding to the coordinate position addressed by the pen 15. Such an operation is the same as described previously with regard to FIGS. 3 and 4.

In the case of using a heat pen in place of the light pen, the element 12 is formed of a heat-sensitive resistor, for example, an Mn-Ni-Co oxide.

Further, in the case of employing a magnetic pen, the element 12 is formed with a Hall effect element, a lead switch or a magnetic resistance element and a coil is wound around the indicating plate to produce a magnetic field at all times so that the aforesaid element may have a predetermined resistance value at each electrode intersecting point. Under such conditions, if desired coordinates are addressed with the magnetic pen adapted to generate a reverse magnetic field, the resistance of the element at the position of the addressed coordinates is lowered, by which a current can be flowed in the charge storage diode corresponding to the addressed coordinates. The coordinate position indicating plate can also be constructed by employing lead switches as other elements responding to the magnetic pen and connecting them in a matrix form.

As described above, in the above example, a desired electrode intersecting point is addressed with the light, heat or magnetic pen and a forward current is thereby caused to flow in the charge storage diode corresponding to the addressed electrode intersecting point and then a backward current flowing in the charge storage diode is utilized as information of the position of the addressed coordinate. This example does not necessitate direct contact of the pen with the electrodes, and hence is easy to handle. Further, the voltage applied to the electrodes is not a complicated pulse voltage, so that peripheral circuits can also be simplified in construction.

FIG. 7 is a diagram, for explaining another example of this invention. Reference character PDP indicates the plasma display panel also described previously in connection with the foregoing examples. Reference numeral 21 designates a coordinate position indicating plate constructed to be used with a light pen; 22a and 22b identify flexible connecting leads; 23 denotes a film having recorded thereon images 23a and 23b; 24 represents a light intercepting member having a slit 24a formed therein; and 25 shows a source of light. The plasma display panel PDP and the coordinate position indicating plate 21 are shown to be interconnected by the flexible connecting leads 22a and 22b but, in practice, they are connected with each other through such a circuit depicted in FIG. 3.

When the light intercepting member 24 is travelled in a direction of the arrow, light from the light source 25 scans the film 23 through the slit 24a and light corresponding to the images 23a and 23b on the film 23 is projected onto the coordinate position indicating plate 21 to provide the same output as that obtained by addressing the coordinate position indicating plate 21 with a plurality of aligned light pens in accordance with the brightness of the images 23a and 23b, by which writing in the plasma display panel PDP iis achieved. FIG. 7 shows the state in which the images have been scanned by light through the slit 24a to the half of the image 23b and hence written in the plasma display panel PDP correspondingly.

The light scanning may be achieved by fixing the light source 25 and using the light passing through the slit 24a as in the above example but may also be performed by disposing the light source 25 in a casing having formed therein the slit 24a and travelling the casing in the direction of the arrow. In such a case of employing the slit 24a, parallel writing in the plasma display panel is effected and, on the other hand, it is also possible to scan the film 23 by using a light beam; in which case, sequential writing results. Further, if the transistors Q5, Q8 and Q6 and Q7 in FIG. 3 are not used in common with the electrodes but connected for individual lines so that the coordinate position indicating plate 21 may be read by electrical scanning, the scanning of the film by light is not necessary and it is sufficient only to irradiate the entire area of the film at the same time.

When the film 23 is scanned by the light passing through the slit 24a as described above, a write voltage Vw corresponding thereto is applied to the electrode of the plasma display panel PDP to write therein the images 23a and 23b. Accordingly, the images on the film 23 can be transferred as it is to the plasma display panel PDP and the plasma display panel PDP can also be disposed at a desired position within a range in which it can be connected with the coordinate position indicating plate 21.

FIG. 8 is a diagram, for explaining another example of this invention in connection with the case where a map of the stereographic projection is converted into a map of the Mercator method. A coordinate position indicating plate 31 has electrodes 32 and 33 corresponding to latitudes and longitudes of the earth, respectively, and intermediate elements as of a photoconductor, heat-sensitive resistor, pressure-sensitive resistor or the like are interposed between the electrodes 32 and 33 at their intersecting points, as described above with regard to the foregoing examples. A matrix display device 34 has a plurality of parallel electrodes 35 and a plurality of parallel electrodes 36 crossing them at right angles, which are connected with the electrodes 32 and 33 of the coordinate position indicating plate 31, respectively. For the sake of simplicity, the electrodes are shown to be directly interconnected but, in practice, they are connected with each other through such a circuit as depicted in FIG. 3.

By performing writing in the matrix display device 34 by drawing such an illustrated map with a pen such as a contact pen, a light pen or a heat pen selected in accordance with the construction of the coordinate position indicating plate 31 or by light scanning of a film having drawn thereon the map as in the example of FIG. 7, the map of the stereographic projection on the coordinate position indicating plate 31 is converted into a map of the Mercator method and displayed on the matrix display device 34, since the intersecting points of the electrodes 32 and 33 curved in accordance with the latitudes and the longitudes correspond to the intersecting points of the straight-line electrodes 35 and 36 of the plasma display device 34 respectively.

Figure 9:
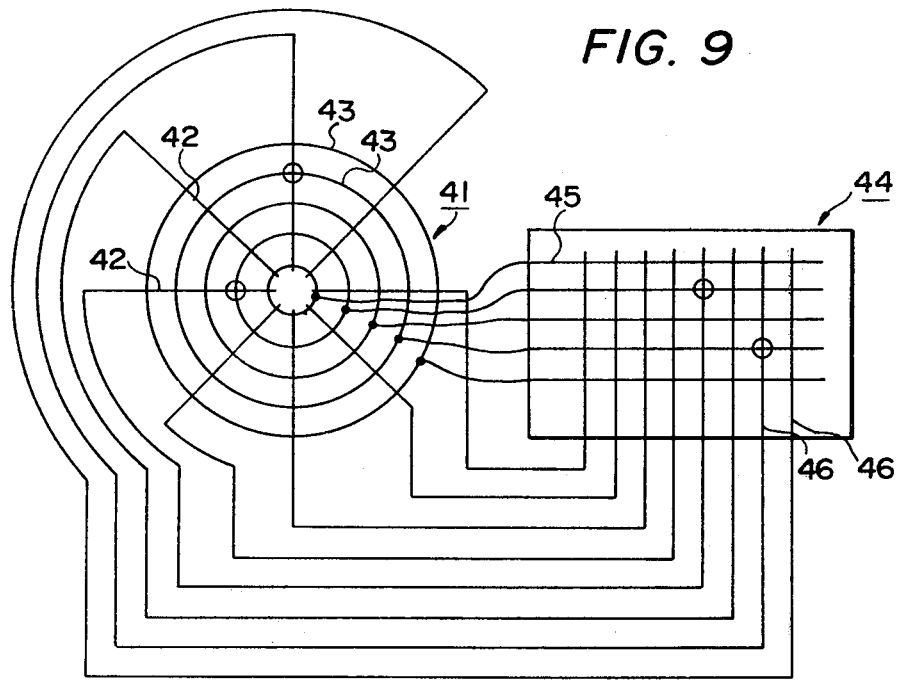

FIG. 9 is a schematic diagram, for explaining another example of this invention as applied to the case of displaying the circular coordinate system in the form of the orthogonal coordinate system. Electrodes of a coordinate position indicating plate 41 are radial and electrodes 43 are concentric and intermediate elements having characteristics corresponding to the light, heat, pressure, magnetic or like pen are interposed between the electrodes 42 and 43 at their intersecting points in the same manner as described previously in the foregoing examples. A plasma display panel 44, which is one example of the matrix display panel, has electrodes 45 and 46 disposed to intersect each other at right angles as in the foregoing examples and the electrodes 42, 45 and the electrodes 43, 46 are connected in pairs. Also in this example, the coordinate position indicating plate 41 and the plasma display panel 44 are interconnected so that a write voltage may be applied to the latter by a signal from the former. In FIG. 9, the circuit therefor is not shown for the sake of brevity.

In the case of a figure such that the electrodes 42 and 43 of the coordinate position indicating plate 41 marked with circles are conducted, signals are written in the plasma display panel 44 at the positions marked with circles to provide a display, in which the position in the radial direction corresponds to the ordinate and the position in the circumferential direction corresponds to the abscissa. In this manner, the figure is converted. Accordingly, this invention can be applied to the case where a radar image indicating a target in the form of a bright spot is displayed in the orthogonal coordinate system of the plasma display panel.

In the foregoing examples, the relations of the electrode arrangements and structures of the coordinate position indicating plate and the plasma display panel may be reversed. In such a case, for example, in the example of FIG. 8, the map of the Mercator method can be cconverted into that of the stereographic projection. Further, the pattern of the electrode arrangements need not be limited specifically to those in the foregoing examples but may be selected as desired in accordance with the mode of conversion. Since the coordinate position indicating plate is simple in construction, it need not always be planar but may be curved as desired.

FIG. 10 is a schematic diagram, for explaining another example of this invention as applied to the case of displaying a figure on a reduced scale. A coordinate position indicating plate 51 is composed of electrodes 52 and 53 disposed to intersect each other at right angles and intermediate layers disposed between the electrodes at their intersecting points in the same manner as in the foregoing examples. The intermediate layers are insulating layers or pressure-sensitive resistance layers in the case of using a contact pen, photoconductive layers in the case of a light, heat sensitive resistance layers in the case of a heat pen, or magnetic layers in the case of a magnetic pen. On the other hand, in a matrix display device, for example, in a plasma display panel 54, the pitch of electrodes 55 and 56 intersecting each other at right angles is smaller than that of the electrodes 52 and 53 of the coordinate position indicating plate 51. Accordingly, by connecting the electrodes 52 and 56 to each other and those 53 and 55 to each other in pairs respectively, a hatched triangular figure on the coordinate position indicating plate 51 is displayed on a reduced scale on the plasma display panel 54 as indicated by circles. Also in the present example, for the sake of brevity, the coordinate position indicating plate 51 and the plasma display panel 54, which should be interconnected through such a circuit as illustrated in FIG. 3, are shown to be directly connected to each other.

Figure 11:
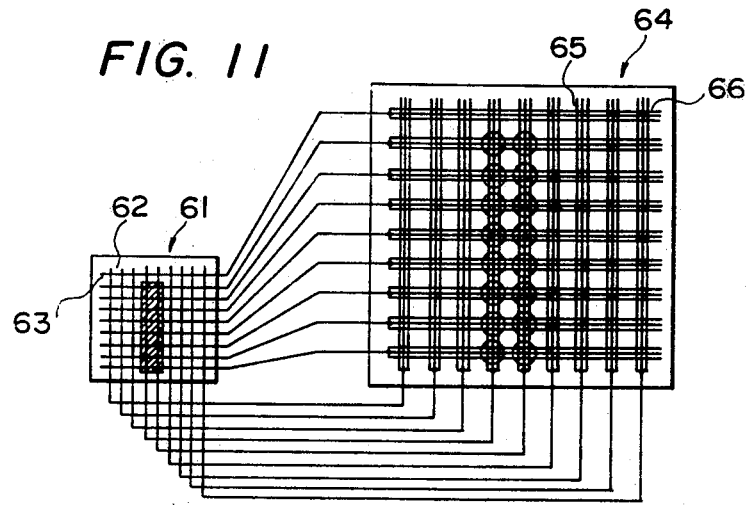

FIG. 11 is a schematic diagram, for explaining still another example of this invention as applied to the case of displaying a figure on an enlarged scale. The pitch of electrodes 62 and 63 of a coordinate position indicating plate 61 is smaller than that of electrodes 65 and 66 of a plasma display panel 64, so that when signals corresponding to a rectangular figure hatched on the coordinate position indicating plate 61 are applied to the plasma display panel 64, the figure is displayed by discharge spots of the plasma display panel marked with circles on a proportionally enlarged scale. The writing in the plasma display panel 64 can be effected by the same means as in the foregoing examples. Further, the pitch of the electrodes of the plasma display panel 64 is large, so that it is preferred for providing a clear display to assemble a plurality of electrodes into one set or employ wide electrodes.

The foregoing examples of FIGS. 8 to 11 are advantageous in that an input figure can easily be displayed in a converted coordinate system or on an enlarged or reduced scale.

It will be apparent that many modifications and variations may be effected without departing from the scope of the novel concepts of this invention.

What is claimed is:

1. A coordinate position information output apparatus comprising:
   a. a coordinate position indicating plate having a plurality of row electrodes and a plurality of column electrodes intersectingly disposed thereon defining intersection points, and an impedance element located at each intersection point of said electrodes;
   b. an external address means for addressing selected intersection points and thereby reducing the impedance and establishing a current path between corresponding electrodes;
   c. a plurality of unidirectional conducting elements each having a relatively long charge storage time and respectively connected to a corresponding one of row and column electrodes to provide a unidirectional current conducting path to each of said intersecting points;

d. a first circuit means for applying a forward voltage to said unidirectional conducting elements causing charge to be stored and a forward current to flow in said unidirectional conducting elements corresponding to addressed intersecting points of said plate;

e. second circuit means for applying a reverse voltage to said unidirectional conducting elements substantially immediately after the termination of said forward voltage, causing reverse current to flow in said unidirectional conducting elements connected to said electrodes corresponding to addressed intersecting points; and f. a matrix display device including a plurality of input conductors each corresponding to a respective one of said row and column electrodes, each of said input conductors being connected to respective ones of said unidirectional conducting elements;

whereby coordinate display information is supplied to said matrix display device by said input conductors as said reverse current flows in said unidirectional conducting elements in proportion to the charge stored therein.

2. A coordinate position information apparatus as in claim 1 wherein said second circuit means applies a reverse voltage of $+Vw/2$ to said unidirectional conducting elements corresponding to said plurality of row electrodes, and a reverse voltage of $-Vw/2$ to said unidirectional conducting elements corresponding to said plurality of column electrodes, wherein $Vw$ is the write voltage for the matrix display device.

3. A coordinate information output apparatus as in claim 1 wherein said matrix display device includes a plurality of display electrodes respectively connected to said plurality of input conductors, said display electrodes disposed within said matrix display device to provide current paths for said reverse current from respective ones of said unidirectional conducting elements.

4. A coordinate position information output apparatus as in claim 1 further comprising timing signal means controlling said first and second circuits for alternately and periodically applying said forward voltages and said reverse voltages respectively to said unidirectional conducting elements.

5. A coordinate position information output apparatus as in claim 3 wherein the angles of intersection between the plurality of row electrodes and the plurality of column electrodes disposed on said coordinate position indicating plate are different than the angles of intersection between corresponding electrodes and said matrix display device.

6. A coordinate position information output apparatus as in claim 3 wherein said plurality of row electrodes and said plurality of column electrodes have a non-linear relationship to said corresponding plurality of electrodes in said matrix display device.

7. A coordinate position information output apparatus according to claim 1 wherein said coordinate position indicating plate is curved.

8. A coordinate position information output apparatus comprising: a coordinate position indicating plate with a first surface, a plurality of row electrodes and a plurality of column electrodes disposed on said first surface forming electrode intersecting points and defining address points, impedance element means establishing electrical resistance between said plurality of row electrodes and said plurality of column electrodes at said intersecting points;

an external addressing means for lowering the resistance between said row electrodes and said column electrodes corresponding to selected address points;

a first circuit means including a plurality of charge storage diodes, each of which is connected to a corresponding one of said row and column electrodes, said first circuit means applying a forward voltage to said charge storage diodes, said charge storage diodes being connected to said electrodes so as to maintain a forward current flow through said corresponding charge storage diodes when said corresponding address point is addressed by said external address means and said forward voltage is applied;

second circuit means connected to said charge storage diodes and applying a reverse voltage thereto at the termination of said forward voltage causing said charge storage diodes which were maintaining a forward current flow to momentarily maintain a reverse current flow;

a matrix display panel having a first set of electrodes which correspond to said plurality of row electrodes, a second set of electrodes which correspond to said plurality of column electrodes, wherein said first set of electrodes form intersections with said second set of electrodes and are separated by a display medium, said intersections defining display points on said matrix display panel, each electrode of said first and second sets of electrodes being connected to a respective one of said charge storage diodes whereby said reverse current flows in said corresponding electrodes of said first and second sets of electrodes, thereby activating said display medium in said matrix display panel corresponding to said address points.

9. A coordinate position information output apparatus as in claim 8, wherein said matrix display panel is a plasma display panel and said display medium is a discharge gas.

10. A coordinate position information output apparatus as in claim 8, wherein said external address means is a conducting element which, when applied to a selected one of said address points, causes a corresponding one of said row electrodes and a corresponding one of said column electrodes to be short circuited.

11. A coordinate position information output apparatus according to claim 8, wherein said impedance element is pressure-sensitive and is characterized by a decrease in resistance with an increase in pressure, and said external addressing means is a device for applying pressure to selected ones of said address points, thereby causing forward current to flow between corresponding ones of said row electrodes and said column electrodes.

12. A coordinate position information output apparatus according to claim 8, wherein said impedance element is a photo conductor, and said external addressing means is a light source for addressing selected ones of said address points, thereby causing forward current to flow between corresponding ones of said plurality of row electrodes and said plurality of column electrodes.

13. A coordinate position information output apparatus according to claim 8, further comprising leakage preventing means connected between said charge storage diodes and said plurality of row electrodes and said plurality of column electrodes allowing forward current to flow therethrough when a corresponding address point is addressed and preventing said reverse current from flowing therethrough.

* * * * *

UNITED STATES PATENT AND TRADEMARK OFFICE
CERTIFICATE OF CORRECTION

PATENT NO. : 3,944,740
DATED : March 16, 1976
INVENTOR(S) : Kenji Murase et al

It is certified that error appears in the above–identified patent and that said Letters Patent are hereby corrected as shown below:

Column 3, line 53, change "if" to --If--.
Column 4, line 32, change "as" to --As--.
Column 5, line 2, delete "are" (second occurrence).
Column 5, line 30, change "corrdinate" to --coordinate--.
Column 6, line 27, change "iis" to --is--.
Column 7, line 61, change "cconverted" to --converted--.

*Signed and Sealed this*

*twenty-ninth* Day of *June 1976*

[SEAL]

Attest:

RUTH C. MASON
*Attesting Officer*

C. MARSHALL DANN
*Commissioner of Patents and Trademarks*